US012699824B2

(12) United States Patent
Kumar et al.

(10) Patent No.: US 12,699,824 B2
(45) Date of Patent: Aug. 4, 2026

(54) DETERMINING SUBSTRATE CHARACTERISTICS BY VIRTUAL SUBSTRATE MEASUREMENT

(71) Applicant: Applied Materials, Inc., Santa Clara, CA (US)

(72) Inventors: Dheeraj Kumar, San Jose, CA (US); Samit Barai, Chennai (IN); Pardeep Kumar, Greater Noida (IN); Sundar Narayanan, Cupertino, CA (US); Anantha Sethuraman, Palo Alto, CA (US)

(73) Assignee: Applied Materials, Inc., Santa Clara, CA (US)

( * ) Notice: Subject to any disclaimer, the term of this patent is extended or adjusted under 35 U.S.C. 154(b) by 941 days.

(21) Appl. No.: 17/982,157

(22) Filed: Nov. 7, 2022

(65) Prior Publication Data

US 2024/0152675 A1     May 9, 2024

(51) Int. Cl.
| | |
|---|---|
| *G06F 30/31* | (2020.01) |
| *G01R 31/28* | (2006.01) |
| *G01R 31/319* | (2006.01) |
| *G05B 23/02* | (2006.01) |
| *G06F 30/3308* | (2020.01) |
| *G06F 119/18* | (2020.01) |

(52) U.S. Cl.
CPC ......... *G06F 30/31* (2020.01); *G01R 31/2848* (2013.01); *G01R 31/31912* (2013.01); *G05B 23/0216* (2013.01); *G06F 30/3308* (2020.01); *G05B 2219/49029* (2013.01); *G06F 2119/18* (2020.01)

(58) Field of Classification Search
None
See application file for complete search history.

(56) References Cited

U.S. PATENT DOCUMENTS

| | | | |
|---|---|---|---|
| 7,827,017 B2 | 11/2010 | Kundert | |
| 8,095,484 B2 * | 1/2012 | Cheng .............. | G05B 19/41875 |
| | | | 706/14 |

(Continued)

FOREIGN PATENT DOCUMENTS

| | | |
|---|---|---|
| JP | H0829152 A | 2/1996 |

OTHER PUBLICATIONS

B. Da et al., "Virtual substrate method for nanomaterials characterization," Nature Communications, 8:15629, published May 26, 2017, pp. 1-9. (Year: 2017).*

(Continued)

*Primary Examiner* — Leigh M Garbowski
(74) *Attorney, Agent, or Firm* — Lowenstein Sandler LLP

(57) ABSTRACT

A method includes receiving feature data defining a plurality of features of a virtual substrate. The method further includes preparing the virtual substrate for display on a graphical user interface (GUI). The method further includes receiving one or more first inputs via the GUI. The one or more first inputs are associated with one or more locations of the virtual substrate. The method further includes defining a three-dimensional measurement probe based on the one or more first inputs. The method further includes outputting a measurement of the measurement probe. The measurement is associated with a characteristic of the virtual substrate measured by the three-dimensional measurement probe.

20 Claims, 9 Drawing Sheets

(56) References Cited

U.S. PATENT DOCUMENTS

| | | | |
|---|---|---|---|
| 8,782,577 B2 * | 7/2014 | Fischer | G06F 30/39 |
| | | | 716/112 |
| 9,323,870 B2 * | 4/2016 | Chandra | G06F 30/23 |
| 9,750,425 B2 | 9/2017 | Hashimshony et al. | |
| 11,287,748 B2 * | 3/2022 | Van Oosten | G03F 7/70616 |
| 11,861,289 B2 * | 1/2024 | Egan | G06F 3/04847 |
| 2012/0239369 A1 | 9/2012 | Chang et al. | |
| 2020/0200528 A1 | 6/2020 | Pan et al. | |
| 2021/0041788 A1 * | 2/2021 | Van Oosten | G03F 1/68 |
| 2022/0019724 A1 * | 1/2022 | Egan | G06T 19/20 |

OTHER PUBLICATIONS

International Search Report and Written Opinion for International Application No. PCT/US23/78722, mailed Mar. 11, 2024, 10 Pages.

* cited by examiner

200A

| Substrate Digital Twin 202 | → | Virtual Processing 204 | → | Processed Virtual Substrate 206 | → | Extract Feature Data 208 |

200B

| Set of Virtual Substrate Feature Data 212 | → | Geometric Modeling Kernel 214 | → | Virtual Substrate Measurement 216 | → | Array of Measured Substrate Characteristics 218 |

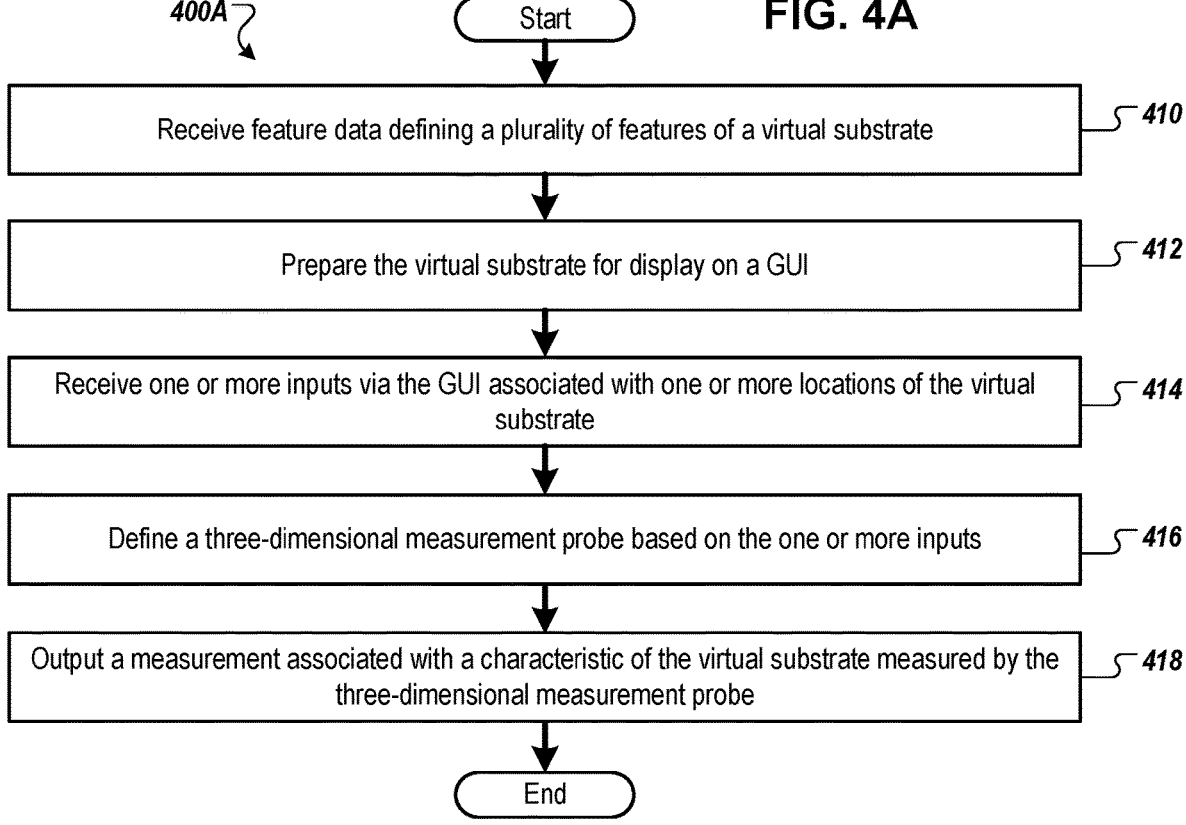

Start

Receive feature data defining a plurality of features of a virtual substrate — 410

Prepare the virtual substrate for display on a GUI — 412

Receive one or more inputs via the GUI associated with one or more locations of the virtual substrate — 414

Define a three-dimensional measurement probe based on the one or more inputs — 416

Output a measurement associated with a characteristic of the virtual substrate measured by the three-dimensional measurement probe — 418

End

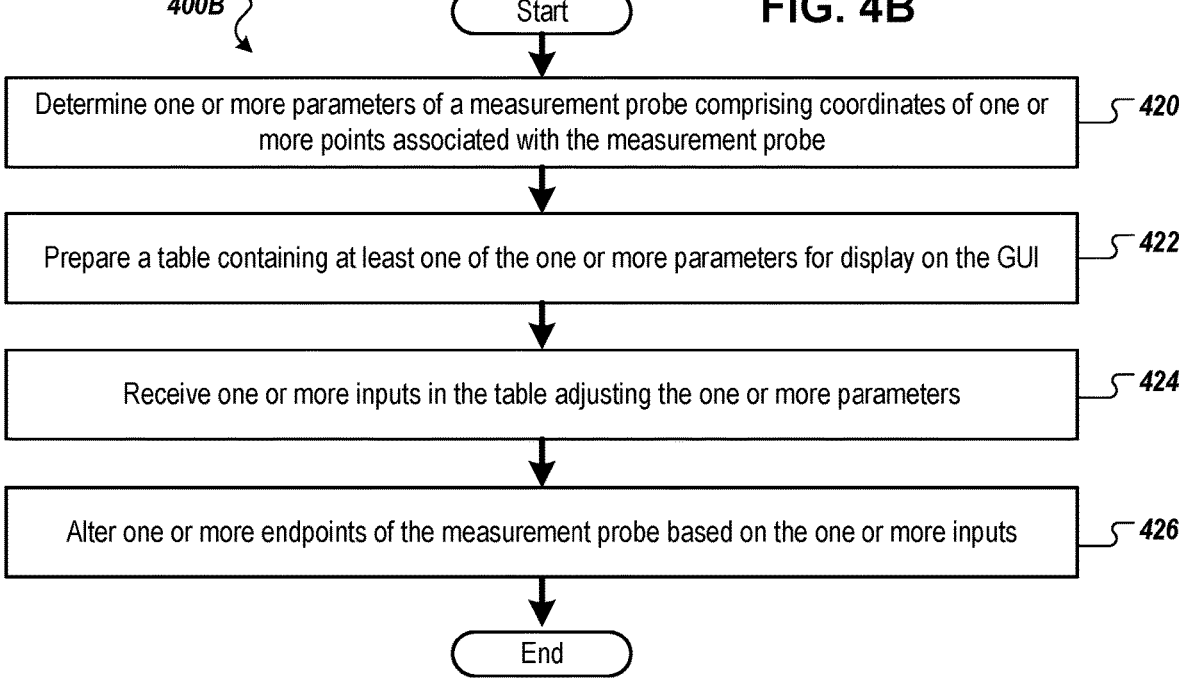

Start

Determine one or more parameters of a measurement probe comprising coordinates of one or more points associated with the measurement probe ⟋ *420*

Prepare a table containing at least one of the one or more parameters for display on the GUI ⟋ *422*

Receive one or more inputs in the table adjusting the one or more parameters ⟋ *424*

Alter one or more endpoints of the measurement probe based on the one or more inputs ⟋ *426*

End

DETERMINING SUBSTRATE CHARACTERISTICS BY VIRTUAL SUBSTRATE MEASUREMENT

TECHNICAL FIELD

The present disclosure relates to methods associated with determining substrate characteristics, such as semiconductor substrate characteristics. More particularly, the present disclosure relates to methods for measuring virtual substrates to determine the substrate characteristics.

BACKGROUND

Products may be produced by performing one or more manufacturing processes using manufacturing equipment. For example, semiconductor manufacturing equipment may be used to produce substrates via semiconductor manufacturing processes. Products are to be produced with particular properties, suited for a target application. Properties of an input substrate to a process operation has an effect on output of that process operation. Measurements may be utilized to predict outcomes of process operations.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular embodiments of the disclosure or any scope of the claims. Its sole purpose is to present some concepts of the disclosure in a simplified form as a prelude to the more detailed description that is presented later.

In one aspect of the present disclosure, a method includes receiving feature data defining a plurality of features of a virtual substrate. The method further includes preparing the virtual substrate for display on a graphical user interface (GUI). The method further includes receiving one or more first inputs via the GUI. The one or more first inputs are associated with one or more locations of the virtual substrate. The method further includes defining a three-dimensional measurement probe based on the one or more first inputs. The method further includes outputting a measurement of the measurement probe. The measurement is associated with a characteristic of the virtual substrate measured by the three-dimensional measurement probe.

In another aspect of the disclosure, a system includes a memory and a processing device coupled to the memory. The processing device is to receive feature data defining a plurality of features of a virtual substrate. The processing device is further to prepare the virtual substrate for display on a GUI. The processing device is further to receive one or more first inputs via the GUI. The one or more first inputs are associated with one or more locations of the virtual substrate. The processing device is further to define a three-dimensional measurement probe based on the one or more first inputs. The processing device is further to output a measurement of the measurement probe. The measurement is associated with a characteristic of the virtual substrate measured by the three-dimensional measurement probe.

In another aspect of the disclosure, a non-transitory machine-readable storage medium stores instructions which, when executed, cause a processing device to perform operations. The operations include receiving feature data defining a plurality of features of a virtual substrate. The operations further include preparing the virtual substrate for display on a GUI. The operations further include receiving one or more first inputs via the GUI. The one or more first inputs are associated with one or more locations of the virtual substrate. The operations further include defining a three-dimensional measurement probe based on the one or more first inputs. The operations further include outputting a measurement of the measurement probe. The measurement is associated with a characteristic of the virtual substrate measured by the three-dimensional measurement probe.

BRIEF DESCRIPTION OF THE DRAWINGS

The present disclosure is illustrated by way of example, and not by way of limitation in the figures of the accompanying drawings.

FIG. 4A is a flow diagram for a method for measuring a characteristic of a virtual substrate, according to some embodiments of the present disclosure.

FIG. 4B is a flow diagram for a method for altering a measurement probe for measuring a virtual substrate, according to some embodiments of the present disclosure.

DETAILED DESCRIPTION

Figure 1:
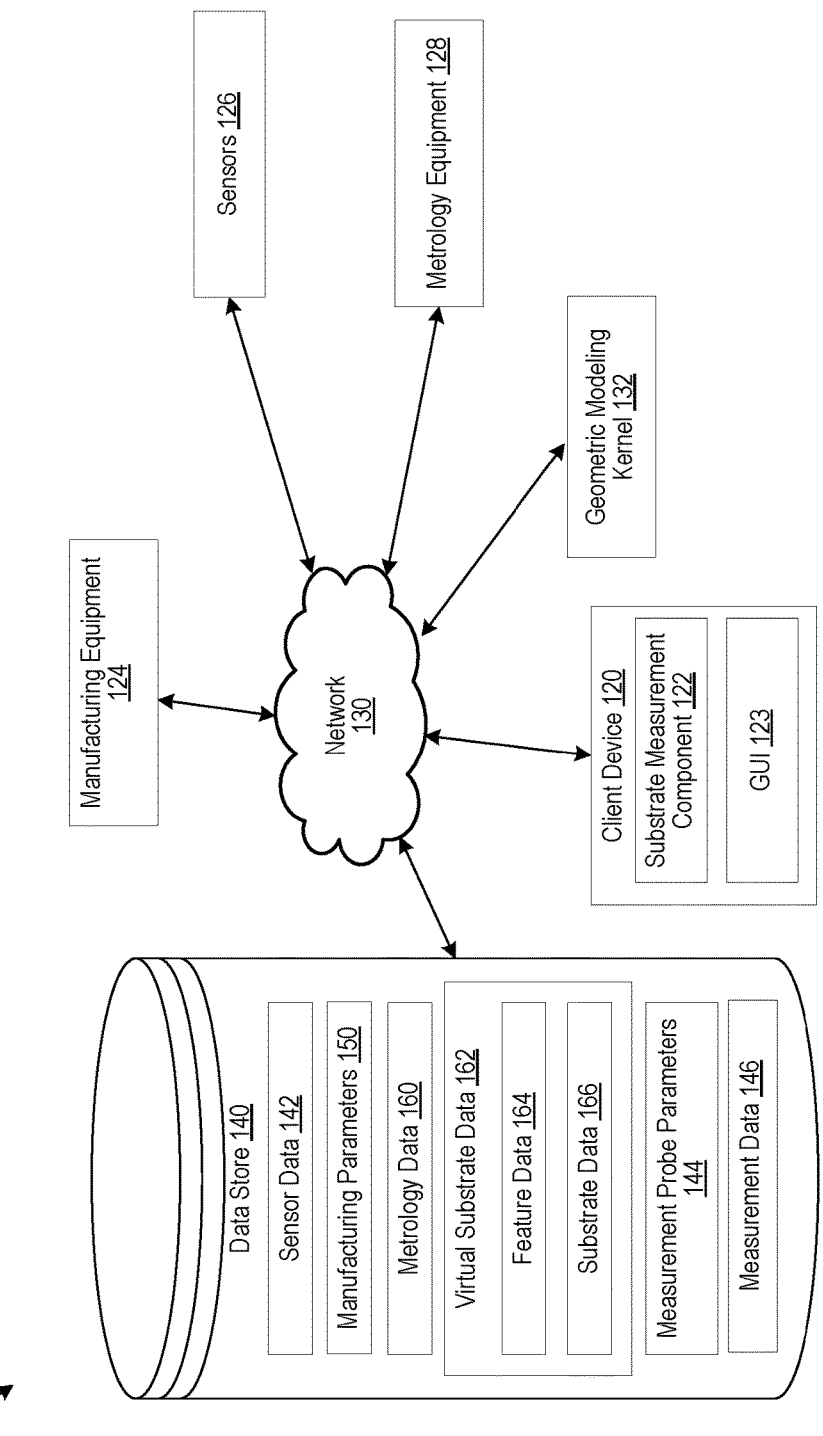
FIG. 1 is a block diagram illustrating an exemplary system architecture, according to some embodiments of the present disclosure.

Described herein are technologies related to determining substrate characteristics by virtual substrate measurement. Manufacturing equipment is used to produce products, such as substrates (e.g., wafers, semiconductors). Manufacturing equipment may include a manufacturing or processing chamber to separate the substrate from an external environment. The properties of produced substrates are to meet target values to facilitate specific functionalities. Manufacturing parameters are selected to produce substrates that meet the target property values. Many manufacturing parameters (e.g., hardware parameters, process parameters, etc.) contribute to the properties of processed substrates. Manufacturing systems may control parameters by specifying a set point for a property value, receiving data from sensors disposed within the manufacturing chamber, and making adjustments to the manufacturing equipment until the sensor readings match the set point.

A processing procedure (e.g., a method of manufacturing a substrate) may include many processing operations (e.g., processing steps). For example, a semiconductor wafer may be manufactured by adding material to a substrate in one or more deposition operations, removing material from the substrate in one or more etch operations, altering properties of the substrate in one or more annealing operations, etc. Output of a processing operation is dependent on the input product the operation is performed upon. For example, results of a deposition operation depend on the properties of the substrate upon which material is deposited.

It may be valuable to predict results of a processing operation. Results may be predicted via modeling, e.g., using one or more physics-based models to predict the outcome of a processing operation. A physics-based model may include a deposition model, an etch model, and/or a model for any type of processing performed upon a substrate. A model may be provided with data indicative of an input substrate, and generate a prediction of an output substrate after performance of the modeled processing operation. Substrate process models include simulation models, which receive as input simulation parameters such as etch or deposition rate, change in etch or deposition rate over time, etc. Substrate process models may include models that receive as input process parameters, such as gas flow rate, temperature, radio frequency, etc. These substrate process models may output a digital twin of a processed substrate. The digital twin or virtual substrate may have digital features (e.g., such as critical dimensions) and/or characteristics that substantially represent a substrate processed by a substrate processing system (e.g., in one or more substrate process chambers).

It may be advantageous to measure features and/or characteristics of the virtual substrate to better predict results of a processing operation. Many conventional software-based systems do not provide the functionality to do so. For example, conventional systems may be incapable of performing three-dimensional measurements.

Systems and methods of the current disclosure may address one or more of these shortcomings of conventional methods. In some embodiments, feature data is received that defines a plurality of features of a virtual substrate. The virtual substrate may be a digital twin of a substrate processed according to a process recipe by a substrate processing system as described herein. The feature data may have been generated by digitally processing the virtual substrate using process parameters as described herein above. In some embodiments, the processed virtual substrate is then be prepared for display on a GUI. In some embodiments, a geometric modeling kernel (e.g., a CAD kernel) is used to generate a graphical representation of the virtual substrate on the GUI.

The GUI may include multiple user-interactive features. For example, the GUI may include features configured to allow the user to measure features (e.g., critical dimensions) of the virtual substrate displayed on the GUI. Additionally, the GUI may include features configured to allow the user to manipulate the view of the virtual substrate displayed on the GUI. One or more inputs may be received via the GUI (e.g., from the user) to define one or more virtual probes (e.g., 3D virtual probes). In some embodiments, the inputs may be inputs defining 3D virtual probes that cause a measurement to be made to measure one or more features of the virtual substrate. Each of the inputs may be associated with a location of the virtual substrate. For example, the user may click on a location on the virtual substrate in the GUI. In some embodiments, the inputs are made in one or more views of the virtual substrate displayed on the GUI. For example, the user may click on a first location of the virtual substrate in a first view on the GUI (e.g., a side view of the virtual substrate) and may click on second location of the virtual substrate in another view on the GUI (e.g., a top view of the virtual substrate). The first and second selected locations may be 2D locations (e.g., 2D coordinates) and/or 3D locations (e.g., 3D coordinates). In some embodiments, inputs can be made in a three-dimensional perspective view of the virtual substrate and/or a cross-sectional view of the virtual substrate.

In some embodiments, a three-dimensional measurement probe is defined based on the inputs. The measurement probe may be to measure one or more features of the virtual substrate. For example, the measurement probe may measure the distance (e.g., along a line) between two or more locations of the virtual substrate. In another example, the measurement probe may measure a distance between two or more surfaces of the virtual substrate. In some embodiments, the three-dimensional measurement probe may be defined in three dimensions. One or more parameters of the measurement probe may be output for display on the GUI. For example, the coordinates of the endpoints of the measurement probe (e.g., x coordinates, y coordinates, z coordinates) may be displayed in a table on the GUI. The parameters may be changed based on inputs (e.g., by the user via the GUI) in some embodiments.

In some embodiments, the measurement of the three-dimensional measurement probe is output. The measurement may be output for display on the GUI. The measurement may be associated with a characteristic of the virtual substrate. The characteristic may be determined by the measurement of the measurement probe. For example, the measurement may reflect the distance between two surfaces (e.g., virtual surfaces) of the virtual substrate (e.g., a critical dimension). In another example, the measurement may reflect the depth of a virtual body of the virtual substrate. Boolean operations (such as union or intersection) between these probes and the virtual substrate may also be used to extract other metrology data; including, but not limited to, critical dimensions for a deposition or cut process or deformations (e.g., bending deformations, etc.) that may occur during processing. In some embodiments, the characteristic can be used to determine an adjustment to a process recipe based on the measurement.

Aspects of the present disclosure provide technical advantages over conventional systems and methods. By providing features to define a three-dimensional measurement probe of a virtual substrate, features of a virtual substrate that are not measurable in two dimensions can be measured. Further, aspects of the disclosure can permit faster measurement of the virtual substrate, saving time and expense. Additionally, according to aspects of the present disclosure, virtual substrate features can be more clearly and accurately measured when compared to conventional systems of measurement. More accurate measurement of the virtual substrate can lead to better predictions regarding processed substrates, leading to higher quality processed substrates that more closely meet a target specification. The more accurate measurements can also lead to improved process recipes for processing substrates. Improving a process recipe, or the like in view of virtual substrate measurements has the advantages of reducing time, energy, chamber wear, chamber maintenance, chamber maintenance time, replacement components, materials, and/or cost of disposal associated with generating products that do not meet target performance standards.

FIG. 1 is a block diagram illustrating an exemplary system 100 (exemplary system architecture), according to some embodiments. The system 100 includes a client device 120, manufacturing equipment 124, sensors 126, metrology equipment 128, geometric modeling kernel 132, and data store 140.

Sensors 126 may provide sensor data 142 associated with manufacturing equipment 124 (e.g., associated with producing, by manufacturing equipment 124, corresponding products, such as substrates). Sensor data 142 may be used to ascertain equipment health and/or product health (e.g., product quality). Manufacturing equipment 124 may produce products following a recipe or performing runs over a period of time. In some embodiments, sensor data 142 may include values of one or more of optical sensor data, spectral data, temperature (e.g., heater temperature), spacing (SP), pressure, High Frequency Radio Frequency (HFRF), radio frequency (RF) match voltage, RF match current, RF match capacitor position, voltage of Electrostatic Chuck (ESC), actuator position, electrical current, flow, power, voltage, etc. Sensor data (e.g., a portion of the sensor data 142) may be associated with a product currently being processed, a product recently processed, a number of recently processed products, etc. Sensor data may include data stored associated with previously produced products. Sensor data 142 may include attribute data, label of a state of manufacturing equipment, etc. Examples of attribute data include labels of manufacturing equipment ID or design, sensor ID, type, and/or location. Examples of labels of a state of manufacturing equipment include a present fault, a service lifetime, and so on.

Sensor data 142 may be associated with, correlated to, and/or indicative of manufacturing parameters such as hardware parameters of manufacturing equipment 124 or process parameters of manufacturing equipment 124. Examples of hardware parameters include hardware settings or installed components, such as size, type, etc. of installed components. Examples of process parameters include heater settings, gas flow settings, pressure settings, and so on. Data associated with some hardware parameters and/or process parameters may, instead or additionally, be stored as manufacturing parameters 150. The manufacturing parameters 150 may include historical manufacturing parameters (e.g., associated with historical processing runs) and current manufacturing parameters. Manufacturing parameters 150 may be indicative of input settings to the manufacturing device (e.g., heater power, gas flow, etc.). Sensor data 142 and/or manufacturing parameters 150 may be provided while the manufacturing equipment 124 is performing manufacturing processes (e.g., equipment readings while processing products). Sensor data 142 may be different for each product (e.g., each substrate). Substrates may have property values measured by metrology equipment 128. Examples of property values include film thickness, film strain, critical dimension, optical properties, electrical properties, etc. The properties values may be measured at a standalone metrology facility, measured by an integrated or inline metrology system, or the like. Metrology data 160 may be a component of data store 140. Metrology data 160 may include historical metrology data (e.g., metrology data associated with previously processed products).

In some embodiments, metrology data 160 may be provided without use of a standalone metrology facility. For example, metrology data 160 may be in-situ metrology data (e.g., metrology or a proxy for metrology collected during processing), integrated metrology data (e.g., metrology or a proxy for metrology collected while a product is within a chamber or under vacuum, but not during processing operations), inline metrology data (e.g., data collected after a substrate is removed from vacuum), etc. Metrology data 160 may include current metrology data (e.g., metrology data associated with a product currently or recently processed). In some embodiments, metrology data 160 corresponds to historical property data of products and predictive data 168 is associated with predicted property data. Historical property data of products may include data for products processed using manufacturing parameters associated with historical sensor data and historical manufacturing parameters.

Metrology equipment 128 may include microscopy and/or imaging equipment. Metrology equipment 128 may include one or more devices for obtaining an image of a substrate, of a portion of a substrate, of features of a substrate, or the like. Metrology equipment 128 may include SEM equipment, XSEM equipment, TEM equipment, and/or other forms of imaging and microscopy equipment. Metrology data 160 may include image data, microscopy data, and the like.

In some embodiments, sensor data 142, metrology data 160, or manufacturing parameters 150 may be processed (e.g., by the client device 120). Processing of the sensor data 142 may include generating features (e.g., virtual features). In some embodiments, the features are a pattern in the sensor data 142, metrology data 160, and/or manufacturing parameters 150. Examples of such features include slope, width, height, peak, etc. In some embodiments, the features are a combination of values from the sensor data 142, metrology data, and/or manufacturing parameters. Examples of such features include power derived from voltage and current, etc.

Each instance (e.g., set) of sensor data 142 may correspond to a product (e.g., a substrate), a set of manufacturing equipment, a type of substrate produced by manufacturing equipment, or the like. Each instance of metrology data 160 and manufacturing parameters 150 may likewise correspond to a product, a set of manufacturing equipment, a type of substrate produced by manufacturing equipment, or the like. The data store may further store information associating sets of different data types, e.g. information indicative that a set of sensor data, a set of metrology data, and a set of manufacturing parameters are all associated with the same product, manufacturing equipment, type of substrate, etc.

Data store 140 may further include virtual substrate data 162. Virtual substrate data 162 may include data related to simulated, synthetic, and/or virtual substrates. Virtual substrate data 162 may include measurements of features, parameters of features, images of features, etc. Various characteristics and representations of features may be stored as feature data 164. Virtual substrate data 162 may include measurements, parameters, and/or images of simulated substrates. Characteristics and representations of simulated and/or virtual substrates may be stored as substrate data 166. Substrate data 166 may include 2-dimensional and/or 3-dimensional arrays of features.

Client device 120, manufacturing equipment 124, sensors 126, metrology equipment 128, geometric modeling kernel 132, and data store 140 may be coupled to each other via network 130 for determining substrate characteristics by virtual substrate measuring. In some embodiments, network 130 may provide access to cloud-based services. Operations performed by client device 120, data store 140, etc., may be performed by virtual cloud-based devices.

In some embodiments, network 130 is a public network that provides client device 120 with access to the predictive server 112, data store 140, and other publicly available computing devices. In some embodiments, network 130 is a private network that provides client device 120 access to manufacturing equipment 124, sensors 126, metrology equipment 128, data store 140, and other privately available computing devices. Network 130 may include one or more Wide Area Networks (WANs), Local Area Networks (LANs), wired networks (e.g., Ethernet network), wireless networks (e.g., an 802.11 network or a Wi-Fi network), cellular networks (e.g., a Long Term Evolution (LTE) network), routers, hubs, switches, server computers, cloud computing networks, and/or a combination thereof.

Client device 120 may include computing devices such as Personal Computers (PCs), laptops, mobile phones, smart phones, tablet computers, netbook computers, network connected televisions ("smart TV"), network-connected media players (e.g., Blu-ray player), a set-top-box, Over-the-Top (OTT) streaming devices, operator boxes, etc. Client device 120 may include a substrate measurement component 122. Substrate measurement component 122 may receive user input (e.g., via a Graphical User Interface (GUI) 123 displayed via the client device 120) of an indication associated with a location on a virtual substrate displayed on the GUI 123. In some embodiments, substrate measuring component 122 determines a measurement associated with a three-dimensional measurement probe defined on a graphical representation of a virtual substrate based on user input (e.g., input via GUI 123).

In some embodiments, the graphical representation of the virtual substrate is presented on the GUI 123 via geometric modeling kernel 132. The geometric modeling kernel 132 may be a solid modeling software component of a computer-aided design package. In some embodiments, the geometric modeling kernel 132 is accessible to the client device 120 via network 130. However, in some embodiments, the geometric modeling kernel 132 may be included on client device 120. The geometric modeling kernel 132 may load a plurality of features of the virtual substrate (e.g., contained in virtual substrate data 162) and prepare the virtual substrate for display (e.g., on the GUI 123). In some embodiments, functions of client device 120 and geometric modeling kernel 132 may be performed by a cloud-based service.

In some embodiments, user inputs (e.g., via the GUI 123) include indications of one or more points on the graphical representation of the virtual substrate. For example, the user may "click" one or more points (e.g., locations) on the virtual substrate via the GUI 123. A line measurement probe may be defined as a line between two or more points indicated by the user. Similarly, a point measurement probe or a spot measurement probe may be defined by a single point indicated by the user. Each of the points may have coordinates (e.g., an x coordinate, a y coordinate, and/or a z coordinate) embodied in one or more parameters of the measurement probe. These parameters may be stored in the data store 140 as measurement probe parameters 144. In some embodiments, the measurement probe parameters 144 may be displayed in a table via GUI 123. In some embodiments, the measurement probe parameters 144 can be altered (e.g., changed, adjusted, etc.) via GUI 123. The substrate measurement component 122 may output measurement data 146 based on the measurement probe. Measurement data 146 may contain one or more measurements determined by the substrate measurement component. In some embodiments, the measurement data 146 can be stored in the data store 140 for later access (e.g., by the client device 120). A measurement associated with the measurement probe may be output by the substrate measurement component 122 based on the measurement probe parameters 144. In some embodiments, a corrective action may be performed (e.g., by the client device 120) based on the measurement. The corrective action may be an adjustment to a process recipe for execution by manufacturing equipment 124. For example, the corrective action may include updating (e.g., altering, adjusting, etc.) one or more manufacturing parameters 150. Updating manufacturing parameters may include setting optimal manufacturing parameters for generating a product. System 100 may have the technical advantage of utilizing more advantageous manufacturing parameters. The manufacturing parameters may include hardware parameters, process parameters, input substrate properties, etc. System 100 may avoid costly results of utilizing suboptimal manufacturing parameters Performing manufacturing processes that result in failure of the components of the manufacturing equipment 124 can be costly in downtime, damage to products, damage to equipment, express ordering replacement components, etc. Systems and/or methods of the current disclosure may alleviate one or more of these deficiencies. By inputting virtual substrates based on measured feature properties to a model, receiving output, and performing corrective actions, system 100 may have a technical advantage over conventional systems. Virtual substrates may be based on metrology data 160. Virtual substrates may be generated based on one or more microscopy images. Corrective actions may include predicted operational maintenance. Corrective actions may include replacement, processing, cleaning, etc., of components. System 100 may have the technical advantage of avoiding costs of unexpected component failure. System 100 may have the advantage of avoiding the cost of unscheduled downtime. System 100 may have the advantage of avoiding the cost of productivity loss to equipment downtime. System 100 may have the advantage of avoiding the cost of product scrap. System 100 may avoid further costs in addition to these by utilizing systems and/or methods of this disclosure. Differences between predicted properties of substrates and measured properties may include indications of drifting, aging, or failing equipment. Monitoring the performance over time of components, e.g. manufacturing equipment 124, sensors 126, metrology equipment 128, and the like, may provide indications of degrading components.

Corrective actions may be associated with one or more types of process control. Process control may include Computational Process Control (CPC), Statistical Process Control (SPC), Advanced Process Control (APC), model-based process control, etc. SPC may include control of electronic components to determine process progress. SPC may include predicting a useful lifespan of components. SPC may include comparing data to historical data, such as comparing trace data to historical data to determine if the trace data is within a 3-sigma window of an average. Corrective actions may be related to preventative operative maintenance, design optimization, updating of manufacturing parameters, updating manufacturing recipes, feedback control, machine learning modification, or the like.

In some embodiments, the corrective action includes providing an alert to a user. The alert may include an alarm to stop or not perform a manufacturing process. The alert may be provided if measurement data 146 indicates an abnormality. The alert may be provided if measurement data 146 indicates an abnormal product, component, equipment, etc. In some embodiments, performance of the corrective action includes causing updates to one or more manufacturing parameters 150. In some embodiments performance of a corrective action may include retraining a machine learning model associated with manufacturing equipment 124. Performance of a corrective action may include updating of other types of models associated with manufacturing equipment 124, such as adjusting a physics-based model, a process model, a virtual model, or the like. In some embodiments, performance of a corrective action may include training a new machine learning model and/or developing a new physics-based or process model associated with manufacturing equipment 124.

Manufacturing parameters 150 may include hardware parameters and/or process parameters. Hardware parameters may include information indicative of which components are installed in the manufacturing system, indications of component age, indication of software version or updates, etc. Process parameters may include temperature, pressure, gas flow rate, electrical current, voltage, lift speed, etc. In some embodiments, the corrective action includes causing preventative operative maintenance. Preventative operative maintenance may include replacing, processing, cleaning, etc., components of the manufacturing system. In some embodiments, the corrective action includes causing design optimization. Design optimization may include updating manufacturing parameters, updating manufacturing processes, and/or updating manufacturing equipment to improve performance of the manufacturing system. In some embodiments, the corrective action includes a updating a recipe. Altering a recipe may include altering the timing of manufacturing subsystems entering an idle or active mode, altering set points of various property values, or the like.

Data store 140 may be a memory (e.g., random access memory), a drive (e.g., a hard drive, a flash drive), a database system, a cloud-accessible memory system, or another type of component or device capable of storing data. Data store 140 may include multiple storage components (e.g., multiple drives or multiple databases) that may span multiple computing devices (e.g., multiple server computers). The data store 140 may store sensor data 142, manufacturing parameters 150, metrology data 160, virtual substrate data 162, measurement probe parameters 144, and/or measurement data 146.

Sensor data 142 may include historical sensor data and current sensor data. Sensor data may include sensor data time traces over the duration of manufacturing processes, associations of data with physical sensors, pre-processed data, such as averages and composite data, and data indicative of sensor performance over time (i.e., many manufacturing processes). Manufacturing parameters 150 and metrology data 160 may contain similar features. For example, metrology data 160 may include historical metrology data and current metrology data. Historical sensor data, historical metrology data, and historical manufacturing parameters may be historical data. Virtual substrate data 162 may include data related to generating virtual, synthetic, and/or digital substrates, for providing to a process model to generate process model output. Virtual substrate data 162 may include data indicative of features, feature characteristics, feature parameterization, substrates, substrates including arrays of features, etc.

Generating and utilizing virtual substrate data 162 has significant technical advantages over other methods. Developing an understanding of relationships between process operation inputs and process operation results may improve process design, product design, operation design, process operation outcomes, etc. Improving process operation outcomes may decrease costs of a process in terms of proportion of defective products produced; proportion of material, time, energy, etc., dedicated to producing defective products; performance of products; etc. By comparing predicted outcomes of a process operation to measured outcomes, deficiencies in models, processing equipment components, process recipes, or the like may be discovered, diagnosed, and corrected. Accurate correction of deficiencies may improve performance of a manufacturing system, improve predictive power of one or more models, reduce unplanned maintenance events, etc.

In some embodiments, a "user" may be represented as a single individual. However, other embodiments of the disclosure encompass a "user" being an entity controlled by a plurality of users and/or an automated source. For example, a set of individual users federated as a group of administrators may be considered a "user."

Some embodiments combine use of a virtual substrate with a GUI that enables point and/or line probes to be defined to measure features such as critical dimensions of virtual substrates quickly and easily. The GUI may include multiple views, such as a top view, a cross sectional side view, an isometric view, a cross sectional isometric view, and so on. In any of the views points for line and/or point probes may be defined based on user interaction with the view of the virtual substrate. The line and/or point probes may then generate measurements of features of the virtual substrate and output the measurements via the GUI.

Figures 2A, 2B:
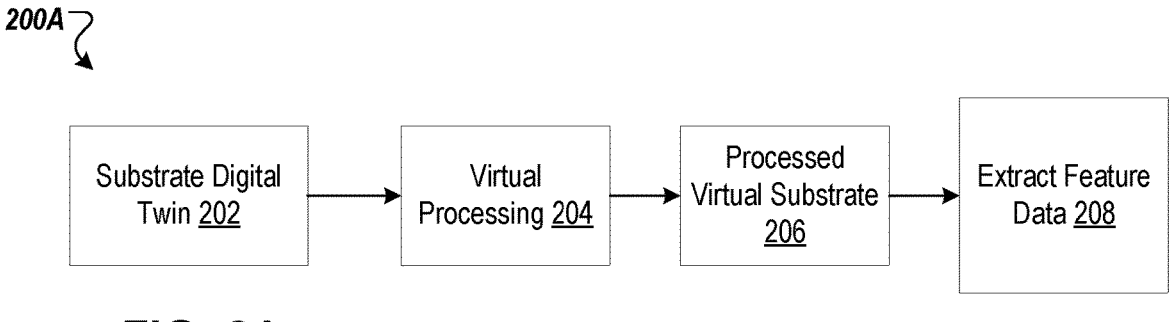
FIG. 2A is a flow diagram for a method of extracting virtual substrate feature data, according to some embodiments of the present disclosure.
FIG. 2B is a flow diagram for a method of measuring virtual substrate characteristics, according to some embodiments of the present disclosure.

FIG. 2A is a flow diagram for a method 200A of extracting virtual substrate feature data, according to some embodiments of the present disclosure. Method 200A may be performed by processing logic that may include hardware (e.g., circuitry, dedicated logic, programmable logic, microcode, processing device, etc.), software (such as instructions run on a processing device, a general purpose computer system, or a dedicated machine), firmware, microcode, or a combination thereof. In some embodiments, method 200A may be performed, at least in part, by substrate measurement component 122 of FIG. 1. In some embodiments, a non-transitory machine-readable storage medium stores instructions that when executed by a processing device (e.g., of substrate measurement component 122) cause the processing device to perform method 200A.

For simplicity of explanation, method 200A is depicted and described as a series of operations. However, operations in accordance with this disclosure can occur in various orders and/or concurrently and with other operations not presented and described herein. Furthermore, not all illustrated operations may be performed to implement method 200A in accordance with the disclosed subject matter. In addition, those skilled in the art will understand and appreciate that method 200A could alternatively be represented as a series of interrelated states via a state diagram or events.

At block 202, a substrate digital twin (e.g., a virtual substrate) is provided. In some embodiments, the substrate digital twin is generated by methods described herein above. The substrate digital twin may correspond to a substrate that is prepared according to a substrate specification (e.g., a substrate recipe). The substrate digital twin may include a plurality of virtual features. The substrate digital twin may be referred to herein as a "virtual substrate."

At block 204, the virtual substrate undergoes virtual processing. In some embodiments, the virtual processing mimics the processing of a substrate by a substrate processing system. For example, the virtual substrate may be virtually processed using virtual processing equipment to replicate the processing of a substrate by processing equipment. The virtual substrate may undergo virtual etching, virtual deposition, etc. A model (e.g., a physics-based model, a statistical model, a machine learning model, etc.) may be used to perform the virtual processing.

At block 206, a processed virtual substrate is output. The processed virtual substrate may include a plurality of virtual features. The features may have been virtually formed during the virtual processing. For example, the virtual features may include virtual pillars, virtual mesas, virtual valleys, etc. on the virtual substrate. The processed virtual substrate may thus be representative of a processed substrate having corresponding real features. In some embodiments, the processed virtual substrate is a digital twin of a substrate processed by processing equipment of a substrate processing system (e.g., a process chamber, etc.) according to a recipe.

At block 208, feature data (e.g., feature data 164 of FIG. 1) is extracted based on the virtual substrate. In some embodiments, the feature data is based on the plurality of features of the virtual substrate. The feature data may be extracted such that a graphical representation of the virtual substrate can be constructed (e.g., by geometric modeling kernel 132 of FIG. 1) based on the feature data.

FIG. 2B is a flow diagram for a method 200B of measuring virtual substrate characteristics, according to some embodiments of the present disclosure. Method 200B may be performed by processing logic that may include hardware (e.g., circuitry, dedicated logic, programmable logic, microcode, processing device, etc.), software (such as instructions run on a processing device, a general purpose computer system, or a dedicated machine), firmware, microcode, or a combination thereof. In some embodiments, method 200B may be performed, at least in part, by substrate measurement component 122 of FIG. 1. In some embodiments, a non-transitory machine-readable storage medium stores instructions that when executed by a processing device (e.g., of substrate measurement component 122) cause the processing device to perform method 200B.

For simplicity of explanation, method 200B is depicted and described as a series of operations. However, operations in accordance with this disclosure can occur in various orders and/or concurrently and with other operations not presented and described herein. Furthermore, not all illustrated operations may be performed to implement method 200B in accordance with the disclosed subject matter. In addition, those skilled in the art will understand and appreciate that method 200B could alternatively be represented as a series of interrelated states via a state diagram or events.

At block 212 a set of data containing a set of virtual substrate features is received. In some embodiments, the data is extracted at block 208 of method 200A from a virtual substrate. In some embodiments, the virtual substrate feature data includes data associated with a plurality of virtual substrate features. The features may include mesas, valleys, pillars, trenches, holes, etc. on the virtual substrate.

At block 214, a geometric modeling kernel (e.g., geometric modeling kernel 132 of FIG. 1) prepares a graphical representation of the virtual substrate for presentation on a GUI (e.g., GUI 123 of FIG. 1). In some embodiments, the geometric modeling kernel may prepare multiple views of the graphical representation of the virtual substrate for display on the GUI. For example, the geometric modeling kernel may prepare a top view of the virtual substrate, a side view of the virtual substrate, a three-dimensional perspective view of the virtual substrate, and/or a cross-sectional view of the virtual substrate. In some embodiments, the geometric modeling kernel includes features that, via the GUI, allow a user to manipulate the representation of the virtual substrate. In some examples, the user may be able to select which view of the virtual substrate (i.e., the graphical representation of the virtual substrate) is displayed on the GUI. In further examples, the user may be able to magnify the view of the virtual substrate (e.g., zoom-in and/or zoom-out) on the GUI. The user may be otherwise able to manipulate the view of the virtual substrate in the GUI. For example, the user may pan, zoom, rotate, etc. an isometric view of the virtual substrate.

At block 216, a measurement probe is defined to measure a feature of the virtual substrate. In some embodiments, the measurement probe is defined (e.g., by the user) via the GUI. For example, one or more inputs can be made via the GUI to define the measurement probe. The inputs may be indications or selections (e.g., clicks and/or gestures in the GUI) associated with locations of/on the virtual substrate. Each of the locations may include an x coordinate, a y coordinate, and/or a z coordinate. In some examples, the inputs define endpoints of a line probe (e.g., a line measurement probe). In some examples, the inputs define one or more point probes (e.g., one or more point measurement probes). A first input may define a first endpoint of the measurement probe and a second input may define a second endpoint of the measurement probe. In some embodiments, the measurement probe is a three-dimensional measurement probe (e.g., a measurement probe in an XYZ coordinate system, etc.). In some embodiments, the probe is a point probe (e.g., that measures depth at a given x,y coordinate).

The measurement probe may be defined in one or more of the views of the virtual substrate displayed by the GUI based on user interaction with the GUI (e.g., based on clicking at one or more points on the virtual substrate). The measurement probe may also be defined based on input of x, y and/or z values (e.g., by a user typing in coordinates). In some embodiments, the first endpoint of the measurement probe can be defined in a first view of the virtual substrate, and a second endpoint of the measurement probe can be defined in a second view of the virtual substrate different from the first view. For example, a user can define (e.g., via the GUI) a first endpoint of a line measurement probe in a side view of the virtual substrate and can define a second endpoint of the line measurement probe in a top view of the virtual substrate. In another example, a user can define a first endpoint of a line measurement probe in a three-dimensional perspective view of the virtual substrate and can define a second endpoint of the line measurement probe in a cross-sectional view of the virtual substrate. In some embodiments, parameters of the measurement probe are output for display in a table on the GUI. The parameters may include the coordinates of the measurement probe endpoints in some embodiments.

In some embodiments, the measurement probe is associated with a measurement of a characteristic of the virtual substrate. The measurement probe may define bounds of the measurement. For example, a measurement may be made along the measurement probe between the endpoints of the measurement probe. In some embodiments, processing logic (e.g., of substrate measurement component 122 of FIG. 1) measures a distance that is between the endpoints of the measurement probe. For example, a distance between two surfaces intersected by a line measurement probe can be measured.

In some embodiments, a point measurement probe can be defined by an indication on a surface of the virtual substrate displayed in the GUI. A point measurement probe may provide a measurement from the indicated surface to the next surface of the virtual substrate along a path orthogonal to the indicated surface. A point measurement probe may also sample the virtual substrate at the indicated point.

At block 218, an array of measured substrate characteristics is output. The array of measured characteristics may include measurements of the measurement probes defined at block 216. In some embodiments, the array of measured characteristics can be used to evaluate the virtual processing of the virtual substrate, and in turn can be used to predict real processing of a real substrate by substrate processing equipment (e.g., substrate process chambers, etc.).

Figure 3A:
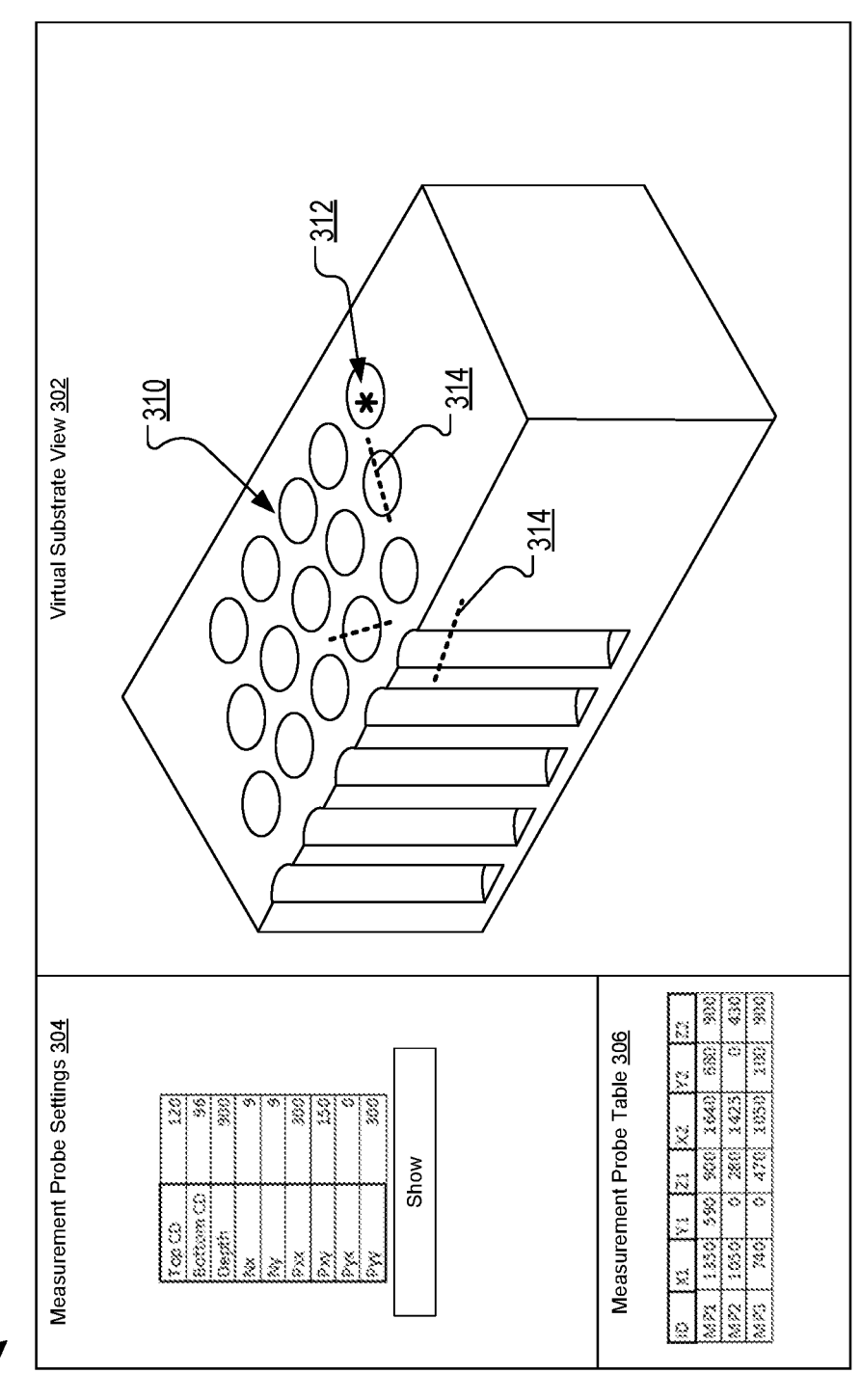
FIGS. 3A-3C depict an example graphical user interface for measuring characteristics of a virtual substrate, according to some embodiments of the present disclosure.
Figure 3B:
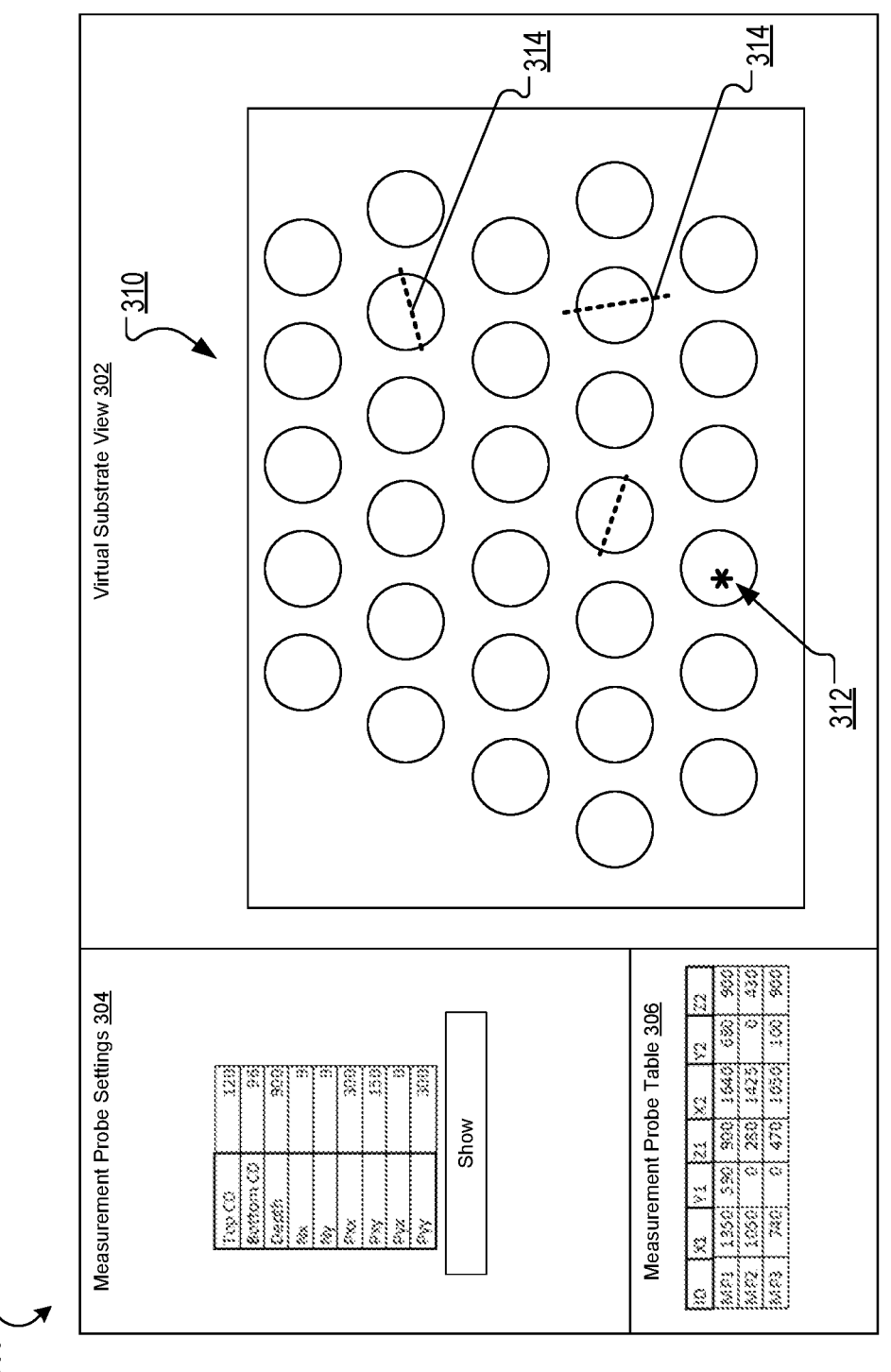
Figure 3C:
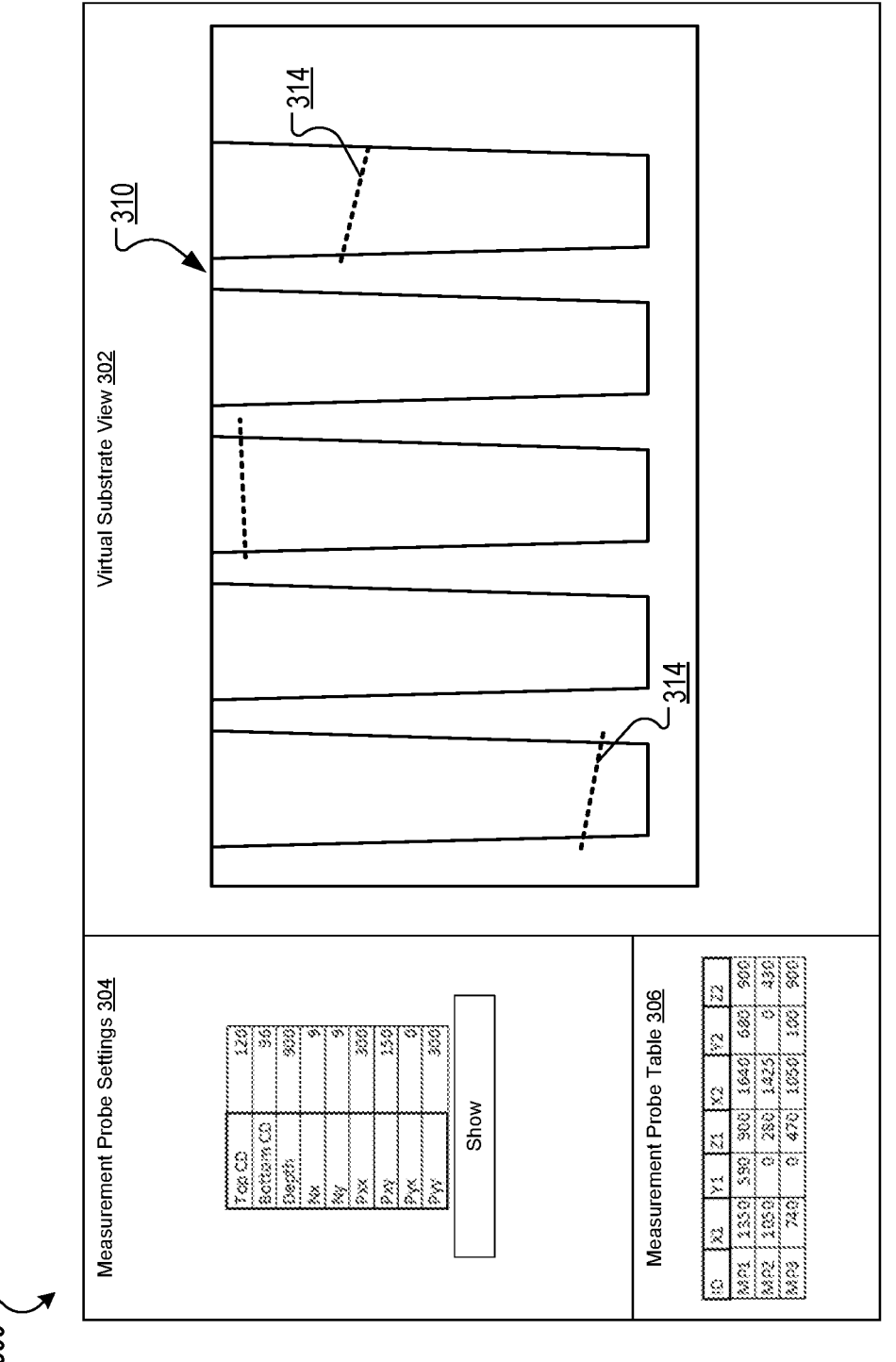

FIGS. 3A-3C depict an example graphical user interface (GUI) 300 for measuring characteristics of a virtual substrate, according to some embodiments of the present disclosure. GUI 300 may correspond to GUI 123 of FIG. 1. In some embodiments, GUI 300 is prepared for display by a client device (e.g., client device 120 of FIG. 1). GUI 300 may be displayed on a monitor (e.g., a monitor screen, a computer screen, a tablet screen, etc.) coupled to the client device.

In some embodiments, GUI 300 includes a virtual substrate view 302 to display a graphical representation of a virtual substrate. A geometric modeling kernel (e.g., geometric modeling kernel 132 of FIG. 1) may compile virtual substrate data (e.g., virtual substrate data 162 of FIG. 1) including extracted feature data of the virtual substrate (e.g., extracted at block 208 of FIG. 2A) into the graphical representation. The representation of the virtual substrate may show a plurality of virtual substrate features 310. The virtual substrate features 310 may be features of the virtual substrate formed by virtual processing (e.g., at block 204 of FIG. 2A). In some embodiments, the virtual substrate features 310 may include holes, pillars, valleys, mesas, channels, trenches, etc.

Referring to FIG. 3A, a three-dimensional perspective view of a virtual substrate is shown. The perspective view may be at least a partial cross-sectional view. Referring to FIG. 3B, a top view of a virtual substrate is shown. Referring to FIG. 3C, a cross-sectional side view of a virtual substrate is shown. The GUI 300 may be configured to allow a user to select a top view, a side view, a three-dimensional perspective view, or a cross-sectional view of the virtual substrate for display in the virtual substrate view 302. In some embodiments, the view of the virtual substrate is manipulatable via one or more features of the GUI 300. For example, a user may be able to rotate the virtual substrate in the view shown, and/or zoom in or out of the view shown using interactive controls of the GUI 300. In some embodiments, a measurement probe can be defined in the virtual substrate view 302. A measurement probe can be a line probe 314 (e.g., a line measurement probe) or a point probe 312 (e.g., a point measurement probe).

In some embodiments, a line probe 314 is defined by two endpoints. A user can select a first endpoint by making a first indication (e.g., such as a clicking indication using a computer mouse) on a first location of the virtual substrate displayed in the virtual substrate view 302. The user can select a second endpoint by making a second indication on a second location of the virtual substrate displayed in the virtual substrate view 302. In some embodiments, the line probe 314 is formed between the first endpoint and the second endpoint. A line probe 314 may be to measure a feature of the virtual substrate that the line probe 314 intersects. For example, a line probe 314 may measure the distance between two surfaces (e.g., of virtual substrate feature 310) along the line probe 314.

In some embodiments, a line probe 314 can be defined via interaction with one or more views of the virtual substrate displayed in the virtual substrate view 302. For example, a first endpoint of a line probe 314 can be selected in a perspective view of the virtual substrate (e.g., as shown in FIG. 3A), while a second endpoint of the line probe can be selected in a top view (e.g., as shown in FIG. 3B). In some embodiments, the GUI 300 is configured to allow a user to switch from one view of the virtual substrate to another to define a line probe 314.

In some embodiments, a point probe 312 is defined by a single point. A user can select a point by making an indication (e.g., such as a clicking indication using a computer mouse) on a location of the virtual substrate displayed in the virtual substrate view 302. A point probe 312 may measure a feature of the virtual substrate corresponding to the point probe 312. For example, a point probe 312 may measure the distance from a first surface corresponding to the indicated location to the next second surface of the virtual substrate along a path orthogonal to the first surface.

In some embodiments, parameters associated with each of the line probes 314 and/or point probes 312 are output to a measurement probe table 306 displayed on the GUI 300. The measurement probe table 306 may display the parameters of the measurement probes. In some embodiments, the measurement probe table 306 displays coordinates of the endpoints of one or more line probes 314. For example, the measurement probe table 306 may display an x coordinate, a y coordinate, and a z coordinate corresponding to a first endpoint of a line probe 314 (e.g., x1, y1, z1). The measurement probe table 306 may additionally display an x coordinate, a y coordinate, and a z coordinate corresponding to a second endpoint of the line probe 314 (e.g., x2, y2, z2).

The measurement probe table 306 may identify each of the measurement probes with an identifier (e.g., MP1, MP2, MP3, etc.). In some embodiments, the GUI 300 is configured to allow a user to alter the parameters of the measurement probes displayed in the measurement probe table 306. In some examples, a user can make one or more inputs (e.g., such as clicking and editing via a computer mouse and keyboard) to alter the endpoint coordinates of a line probe 314. In some examples, a user can alter one or more line probe endpoint coordinates by selecting a measurement probe (e.g., indicated by an identifier as described above) from the measurement probe table 306 and entering a new value for an endpoint coordinate. In some examples, a user can change an x coordinate, a y coordinate, and/or a z coordinate of an endpoint of a measurement probe. In some examples, a user can change one or more coordinates of a line probe 314 and/or one or more coordinates of a point probe 312.

In some embodiments, GUI 300 includes a window displaying measurement probe settings 304. In some embodiments, the measurement probe settings 304 are user-interactive. For example, via the measurement probe settings 304 window, a user can make inputs to one or more settings that govern the measurement probes. These settings may include spatial properties of one or more measurement probes or other qualifiers which determine what the measurement probe is to measure (e.g. line width of a silicon phase of the virtual substrate while ignoring any silicon oxide of the virtual substrate, etc.). In some embodiments, one or more measurement probe settings 304 may determine how a measurement probe is to measure a characteristic of the virtual substrate. In some embodiments, a measurement of a measurement probe are displayed in the measurement probe settings 304. For example, a measurement corresponding to a line probe 314 (e.g., such as a distance between two surfaces along the line probe) may be displayed in the window of the GUI 300 corresponding to the measurement probe settings 304. In some embodiments, one or more measurements of the measurement probes are output for use in determining an adjustment to a recipe (e.g., a substrate processing recipe, a virtual substrate processing recipe) for processing substrates.

FIG. 4A is a flow diagram for a method 400A for measuring a characteristic of a virtual substrate, according to some embodiments of the present disclosure. Method 400A may be performed by processing logic that may include hardware (e.g., circuitry, dedicated logic, programmable logic, microcode, processing device, etc.), software (such as instructions run on a processing device, a general purpose computer system, or a dedicated machine), firmware, micro-code, or a combination thereof. In some embodiments, method 400A may be performed, at least in part, by substrate measurement component 122 of FIG. 1. In some embodiments, a non-transitory machine-readable storage medium stores instructions that when executed by a processing device (e.g., of substrate measurement component 122) cause the processing device to perform method 400A.

For simplicity of explanation, method 400A is depicted and described as a series of operations. However, operations in accordance with this disclosure can occur in various orders and/or concurrently and with other operations not presented and described herein. Furthermore, not all illus-trated operations may be performed to implement method 400A in accordance with the disclosed subject matter. In addition, those skilled in the art will understand and appre-ciate that method 400A could alternatively be represented as a series of interrelated states via a state diagram or events.

At block 410, processing logic receives feature data defining a plurality of features of a virtual substrate. In some embodiments, the features are formed by virtual processing of the virtual substrate.

At block 412, processing logic prepares the virtual sub-strate for display on a GUI. In some embodiments, a geometric modeling kernel creates a graphical representa-tion of the virtual substrate based on the feature data received at block 410. The geometric modeling kernel may prepare the graphical representation of the virtual substrate for display on the GUI.

At block 414, processing logic receives one or more inputs via the GUI (e.g., from a user) associated with one or more locations of the virtual substrate. In some embodi-ments, a user may indicate one or more locations of the virtual substrate in a view of the GUI displaying the virtual substrate. For example, the user may click on (or otherwise indicate) one or more locations on the displayed virtual substrate. The locations can be indicated by the user in one or more displayed views of the virtual substrate. For example, a user can indicate a first location on the virtual substrate in a first view and can indicate a second location in a second view.

At block 416, processing logic defines a three-dimen-sional measurement probe based on the inputs at block 414. In some embodiments, the three-dimensional measurement probe is a line probe or a point probe (e.g., line probe 314 or point probe 312 of FIGS. 3A-3C). In some embodiments, the measurement probe is defined via interaction with a view of the virtual substrate displayed on the GUI (e.g., based on the inputs received at block 414). In some embodiments, endpoints of the measurement probe (e.g., endpoints of a line probe) correspond to the inputs received at block 414. For example, the first location on the virtual substrate may correspond to a first endpoint of a line probe and a second location on the virtual substrate may correspond to a second endpoint of the line probe. The measurement probe may be defined based on the endpoints indicated at block 414.

At block 418, processing logic outputs a measurement of the three-dimensional measurement probe. In some embodi-ments, the measurement is associated with a characteristic of the virtual substrate measured by the three-dimensional measurement probe. For example, the measurement may reflect a dimension of a virtual substrate feature measured by the measurement probe. The measurement may be used for updating a process recipe for processing substrates.

FIG. 4B is a flow diagram for a method 400B for altering a measurement probe for measuring a virtual substrate, according to some embodiments of the present disclosure. Method 400B may be performed by processing logic that may include hardware (e.g., circuitry, dedicated logic, pro-grammable logic, microcode, processing device, etc.), soft-ware (such as instructions run on a processing device, a general purpose computer system, or a dedicated machine), firmware, microcode, or a combination thereof. In some embodiments, method 400B may be performed, at least in part, by substrate measurement component 122 of FIG. 1. In some embodiments, a non-transitory machine-readable stor-age medium stores instructions that when executed by a processing device (e.g., of substrate measurement compo-nent 122) cause the processing device to perform method 400B.

For simplicity of explanation, method 400B is depicted and described as a series of operations. However, operations in accordance with this disclosure can occur in various orders and/or concurrently and with other operations not presented and described herein. Furthermore, not all illus-trated operations may be performed to implement method 400B in accordance with the disclosed subject matter. In addition, those skilled in the art will understand and appre-ciate that method 400B could alternatively be represented as a series of interrelated states via a state diagram or events.

At block 420, processing logic determines one or more parameters of a measurement probe. In some embodiments, the one or more parameters include coordinates of one or more points associated with the measurement probe. In some examples, the one or more parameters include x coordinates, y coordinates, and/or z coordinates of measure-ment probe endpoints. In some embodiments, the one or more parameters are determined based on inputs (e.g., user inputs via a GUI) corresponding to locations (e.g., points) of a virtual substrate displayed in a GUI.

At block 422, processing logic prepares a table that contains at least one of the one or more parameters for display on the GUI (e.g., measurement probe table 306 of FIGS. 3A-3C). In some embodiments, the table is to display endpoint coordinates corresponding to one or more mea-surement probes.

At block 424, processing logic receives one or more inputs adjusting values of the one or more parameters in the table. In some embodiments, the one or more inputs may adjust one or more coordinate values corresponding to endpoints of one or more measurement probes. In some examples, a user may make inputs (via a GUI) to the table to alter the endpoints of a line measurement probe.

At block 426, processing logic alters the one or more endpoints of the measurement probe based on the one or more inputs. A new measurement of the measurement probe may be determined based on the changed endpoints.

Figure 5:
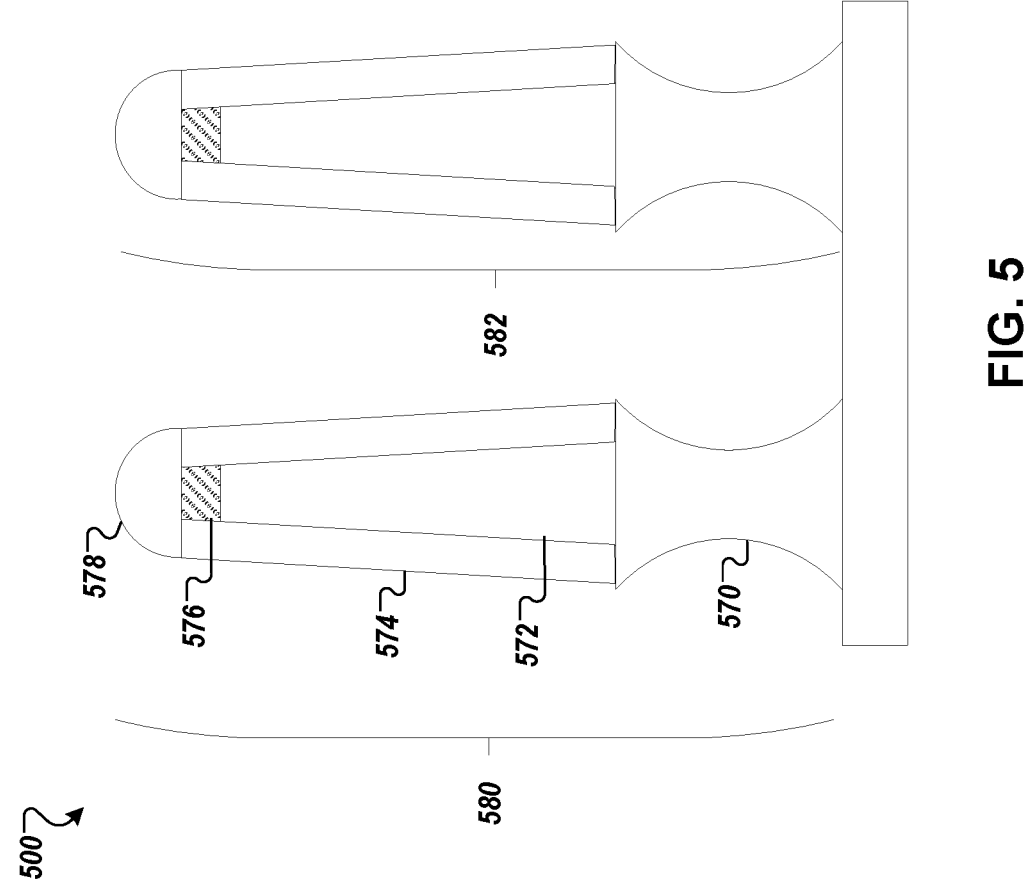
FIG. 5 depicts an example substrate including features, according to some embodiments of the present disclosure.

FIG. 5 depicts an example substrate 500 including fea-tures, according to some embodiments. Substrate 500 may be a physical substrate. Substrate 500 may be a virtual substrate. The substrate 500 may be similar to a microscopy image of a device, e.g., an XSEM or TEM image. Aspects of the present disclosure include providing data indicative of properties of a substrate to a process model that corresponds to one or more process operations. Substrate 500 may be a substrate that has not yet undergone the corresponding process operations. Substrate 500 may be a substrate that has undergone the corresponding process operations.

Substrate 500 includes a number of features. Substrate 500 includes nominally identical features 580 and 582. Device features may include multiple components, be defined by multiple characteristics, etc. Portions of feature 580 stand atop pedestal 570. The device may include a feature with a gate 572. The gate may be surrounded by spacers 574, and topped by mask 576. Deposition material 578 may be disposed on top of mask 576. Other devices, other designs, etc., are within the scope of this disclosure.

The process model may be an etch model, a deposition model, or another model configured to predict results of one or more process operations. For example, the process model may predict outcomes of a process operation that results in deposition of deposition material 578. Measurements of features 580 and 582 may be performed before deposition of deposition material 578 or after deposition of deposition material 578. Some measurement techniques, such as XSEM, may be capable of measuring properties and/or profiles of features that existed before a process operation was performed. For example, an XSEM metrology system may provide data from which the shape of feature 580 before deposition may be extracted and provided to a process model.

Characteristics of a feature may include radii of curvature, slope, distances, and other properties. For example, the radius of curvature of bowing of pedestal 570, slopes of various edges of components such as spacers 574 and/or gate 572, etc., may be characteristics of feature 580. Characteristics of feature 580 may be parameterized, e.g., based on variations between characteristics of feature 580 and feature 582, based on variations between characteristics of feature 580 and other features of substrate 500, based on variations between characteristics of feature 580 and other features of other substrates, etc.

Figure 6:
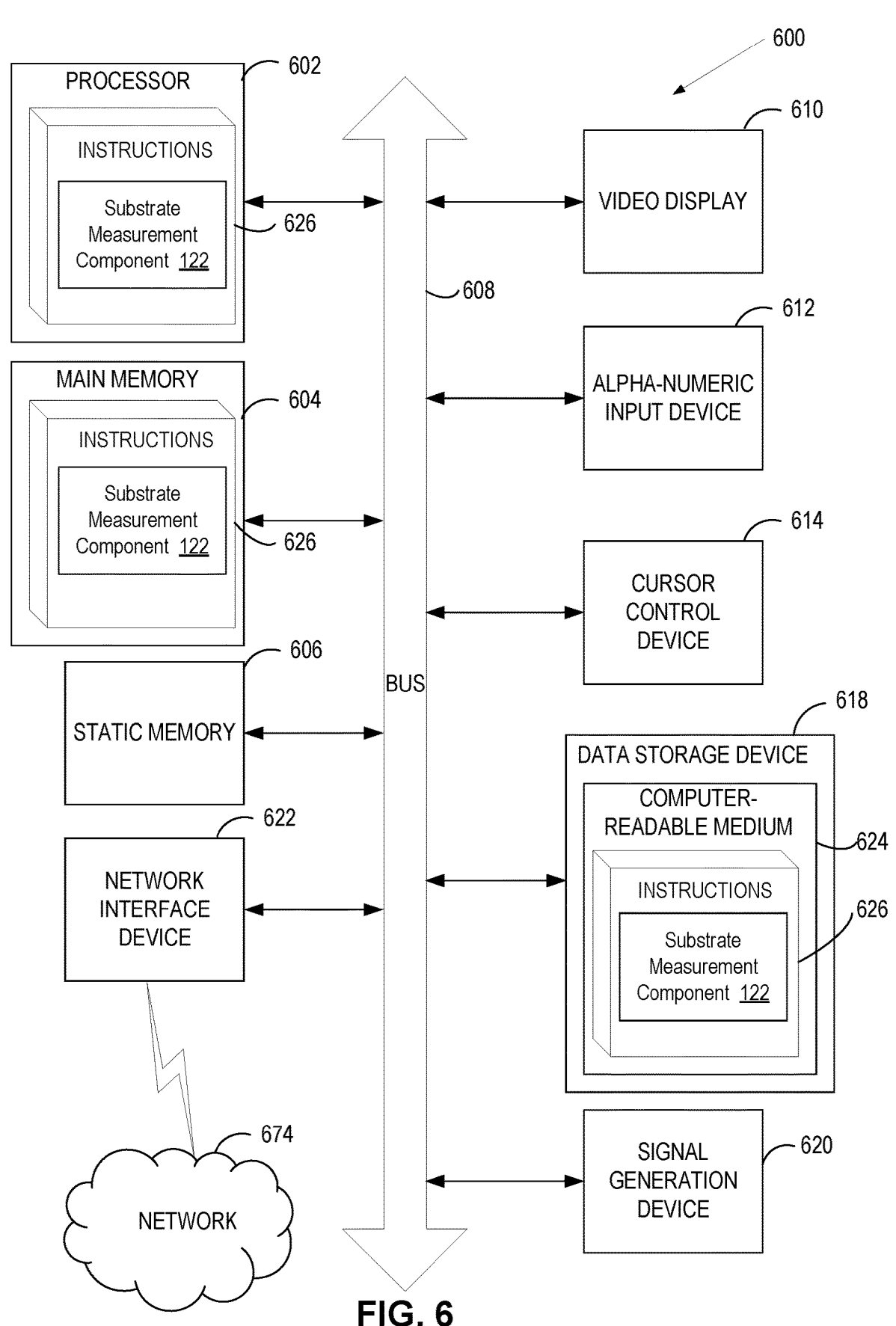
FIG. 6 is a block diagram illustrating a computer system, according to some embodiments of the present disclosure.

FIG. 6 is a block diagram illustrating a computer system 600, according to some embodiments. In some embodiments, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a Set-Top Box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., Random Access Memory (RAM)), a non-volatile memory 606 (e.g., Read-Only Memory (ROM) or Electrically-Erasable Programmable ROM (EEPROM)), and a data storage device 618, which may communicate with each other via a bus 608.

Processing device 602 may be provided by one or more processors such as a general purpose processor (such as, for example, a Complex Instruction Set Computing (CISC) microprocessor, a Reduced Instruction Set Computing (RISC) microprocessor, a Very Long Instruction Word (VLIW) microprocessor, a microprocessor implementing other types of instruction sets, or a microprocessor implementing a combination of types of instruction sets) or a specialized processor (such as, for example, an Application Specific Integrated Circuit (ASIC), a Field Programmable Gate Array (FPGA), a Digital Signal Processor (DSP), or a network processor).

Computer system 600 may further include a network interface device 622 (e.g., coupled to network 674). Computer system 600 also may include a video display unit 610 (e.g., an LCD), an alphanumeric input device 612 (e.g., a keyboard), a cursor control device 614 (e.g., a mouse), and a signal generation device 620.

In some embodiments, data storage device 618 may include a non-transitory computer-readable storage medium 624 (e.g., non-transitory machine-readable storage medium storing instructions) on which may store instructions 626 encoding any one or more of the methods or functions described herein, including instructions encoding components of FIG. 1 (e.g., substrate measurement component 122, etc.) and for implementing methods described herein.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "performing," "providing," "defining," "obtaining," "causing," "accessing," "determining," "adding," "using," "training," "reducing," "generating," "altering," "outputting," "preparing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may include a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods described herein and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and embodiments, it will be recognized that the present disclosure is not limited to the examples and embodiments described. The scope of the disclosure should be determined with reference to the following claims, along with the full scope of equivalents to which the claims are entitled.

What is claimed is:

1. A method, comprising:
   receiving feature data defining a plurality of features of a virtual substrate;
   preparing the virtual substrate for display on a graphical user interface (GUI);
   receiving one or more first inputs via the GUI, wherein the one or more first inputs comprise one or more selected locations of the virtual substrate which are selected by user interaction with the virtual substrate displayed in one or more views via the GUI;
   defining a three-dimensional measurement probe based on the one or more first inputs; and
   outputting a measurement of the measurement probe, wherein the measurement is associated with a characteristic of the virtual substrate measured by the three-dimensional measurement probe.

2. The method of claim 1, wherein preparing the virtual substrate for display on the GUI comprises preparing one or more of a top view of the virtual substrate, a first side view of the virtual substrate, a three-dimensional perspective view of the virtual substrate, or a cross-sectional view of the virtual substrate.

3. The method of claim 2, wherein the measurement probe is defined in one or more of the top view, the first side view, the three-dimensional perspective view, or the cross-sectional view based on the one or more first inputs.

4. The method of claim 3, wherein the measurement probe comprises a line measurement probe, wherein a first end of the line measurement probe is defined via interaction with a first view selected from the top view, the first side view, the three-dimensional perspective view, and the cross-sectional view, and wherein a second end of the line measurement probe is defined via interaction with a second view selected from the top view, the first side view, the three-dimensional perspective view, and the cross-sectional view, the second view being different from the first view.

5. The method of claim 3, wherein the measurement probe comprises a point measurement probe, and wherein the point measurement probe is defined via interaction with a view selected from the top view, the side view, the three-dimensional perspective view, and the cross-sectional view.

6. The method of claim 1, further comprising:
   determining one or more parameters of the measurement probe, the one or more parameters comprising coordinates of one or more points associated with the measurement probe; and preparing a table for display on the GUI, wherein the table contains at least one of the one or more parameters of the measurement probe.

7. The method of claim 6, further comprising:
   receiving one or more second inputs in the table, the one or more second inputs adjusting values of the one or more parameters; and
   altering one or more endpoints of the measurement probe based on the one or more second inputs.

8. The method of claim 1, wherein the one or more first inputs comprise one or more indications associated with the one or more selected locations of the virtual substrate, wherein the one or more selected locations each comprise an X coordinate, a Y coordinate, and a Z coordinate.

9. The method of claim 8, wherein a first endpoint of the measurement probe is defined by a first indication of the one or more indications, wherein a second endpoint of the measurement probe is defined by a second indication of the one or more indications, and wherein the measurement of the measurement probe comprises a distance between the first endpoint and the second endpoint.

10. The method of claim 1, wherein the virtual substrate is prepared for display on the GUI via a geometric modeling kernel.

11. The method of claim 1, wherein the virtual substrate comprises a digital twin of a substrate processed or to be processed by a substrate processing system according to a recipe.

12. The method of claim 11, further comprising:
   determining an adjustment to the recipe based on the measurement of the measurement probe.

13. A system, comprising memory and a processing device coupled to the memory, wherein the processing device is to:
   receive feature data defining a plurality of features of a virtual substrate;
   prepare the virtual substrate for display on a graphical user interface (GUI);
   receive one or more first inputs via the GUI, wherein the one or more first inputs comprise one or more selected locations of the virtual substrate which are selected by user interaction with the virtual substrate displayed in one or more views via the GUI;
   define a three-dimensional measurement probe based on the one or more first inputs; and
   output a measurement of the measurement probe, wherein the measurement is associated with a characteristic of the virtual substrate measured by the three-dimensional measurement probe.

14. The system of claim 13, wherein the measurement probe comprises a line measurement probe, wherein a first end of the line measurement probe is defined via interaction with a first view selected from a top view, a first side view, and a three-dimensional perspective view, and wherein a second end of the line measurement probe is defined via interaction with a second view selected from the top view, the first side view, and the three-dimensional perspective view.

15. The system of claim 13, wherein the processing device is further to:
   determine one or more parameters of the measurement probe, the one or more parameters comprising coordinates of one or more points associated with the measurement probe;
   prepare a table for display on the GUI, wherein the table contains at least one of the one or more parameters of the measurement probe;

receive one or more second inputs in the table, the one or more second inputs adjusting values of the one or more parameters; and alter one or more endpoints of the measurement probe based on the one or more second inputs.

16. The system of claim 13, wherein the one or more first inputs comprise one or more indications associated with the one or more selected locations of the virtual substrate, wherein the one or more selected locations each comprise an X coordinate, a Y coordinate, and a Z coordinate.

17. The system of claim 16, wherein a first endpoint of the measurement probe is defined by a first indication of the one or more indications, wherein a second endpoint of the measurement probe is defined by a second indication of the one or more indications, and wherein the measurement of the measurement probe comprises a distance between the first endpoint and the second endpoint.

18. A non-transitory machine-readable storage medium storing instructions which, when executed, cause a processing device to perform operations comprising:

receiving feature data defining a plurality of features of a virtual substrate;

preparing the virtual substrate for display on a graphical user interface (GUI);

receiving one or more first inputs via the GUI, wherein the one or more first inputs comprise one or more selected locations of the virtual substrate which are selected by user interaction with the virtual substrate displayed in one or more views via the GUI;

defining a three-dimensional measurement probe based on the one or more first inputs; and outputting a measurement of the measurement probe, wherein the measurement is associated with characteristic of the virtual substrate measured by the three-dimensional measurement probe.

19. The non-transitory machine-readable storage medium of claim 18, wherein the one or more first inputs comprise one or more indications associated with the one or more selected locations of the virtual substrate, wherein the one or more selected locations each comprise an X coordinate, a Y coordinate, and a Z coordinate.

20. The non-transitory machine-readable storage medium of claim 18, wherein the virtual substrate comprises a digital twin of a substrate processed or to be processed by a substrate processing system according to a recipe.

* * * * *